Oct. 5, 1965          T. R. LINGLEY          3,209,770
TENT-LIKE STRUCTURES
Filed Aug. 9, 1962                               9 Sheets-Sheet 1
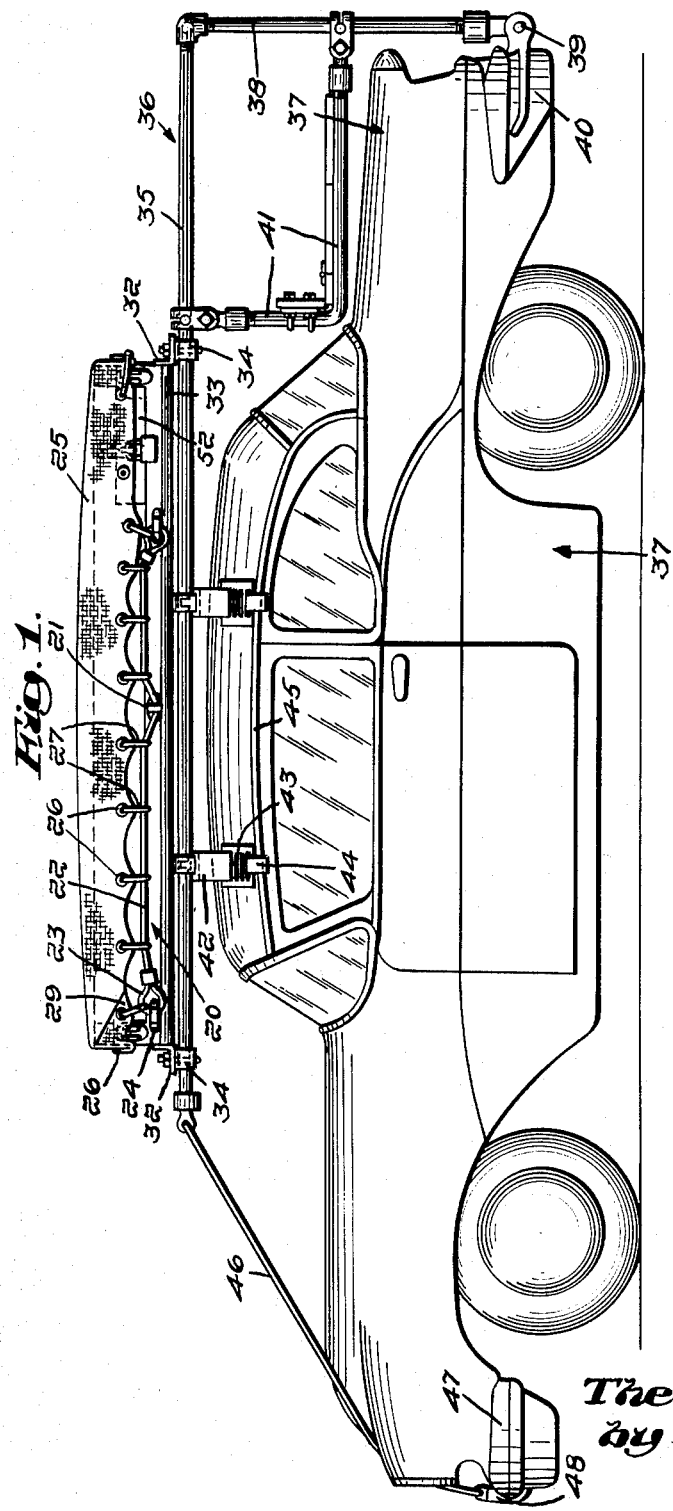
Inventor:
Theodore R. Lingley
by *Attorney*

Oct. 5, 1965  T. R. LINGLEY  3,209,770
TENT-LIKE STRUCTURES
Filed Aug. 9, 1962  9 Sheets-Sheet 2
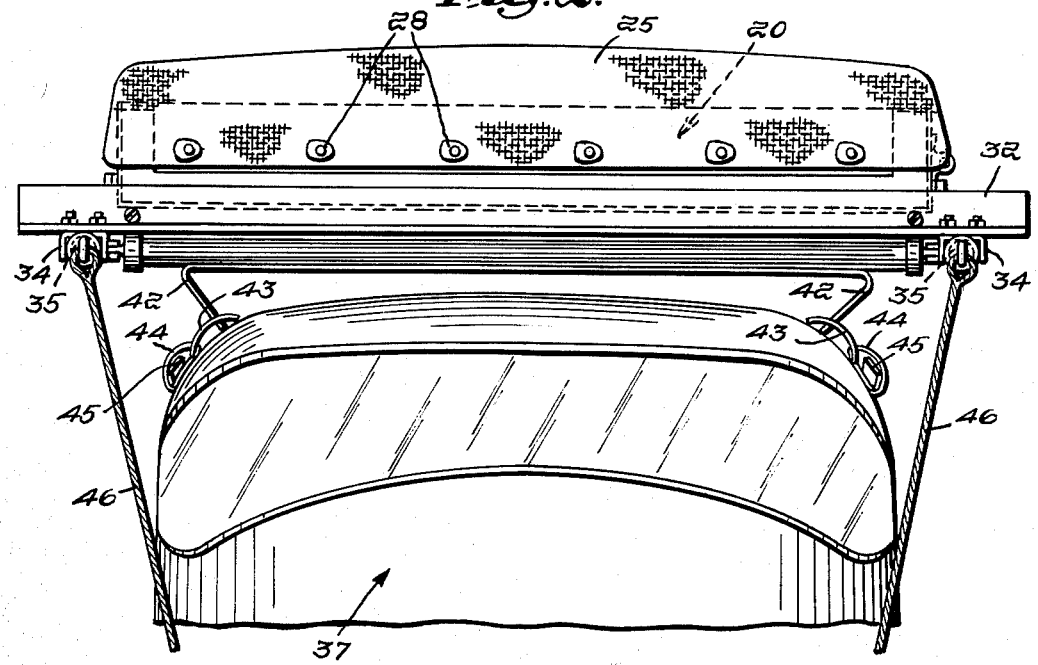
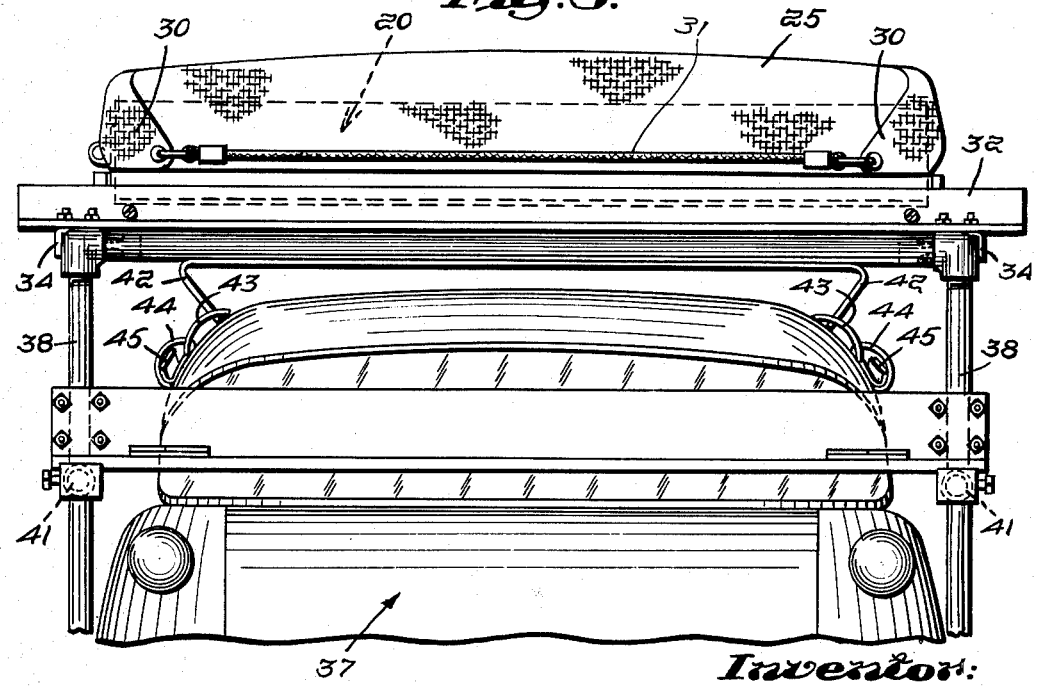
Inventor:
Theodore R. Lingley,
by Attorney

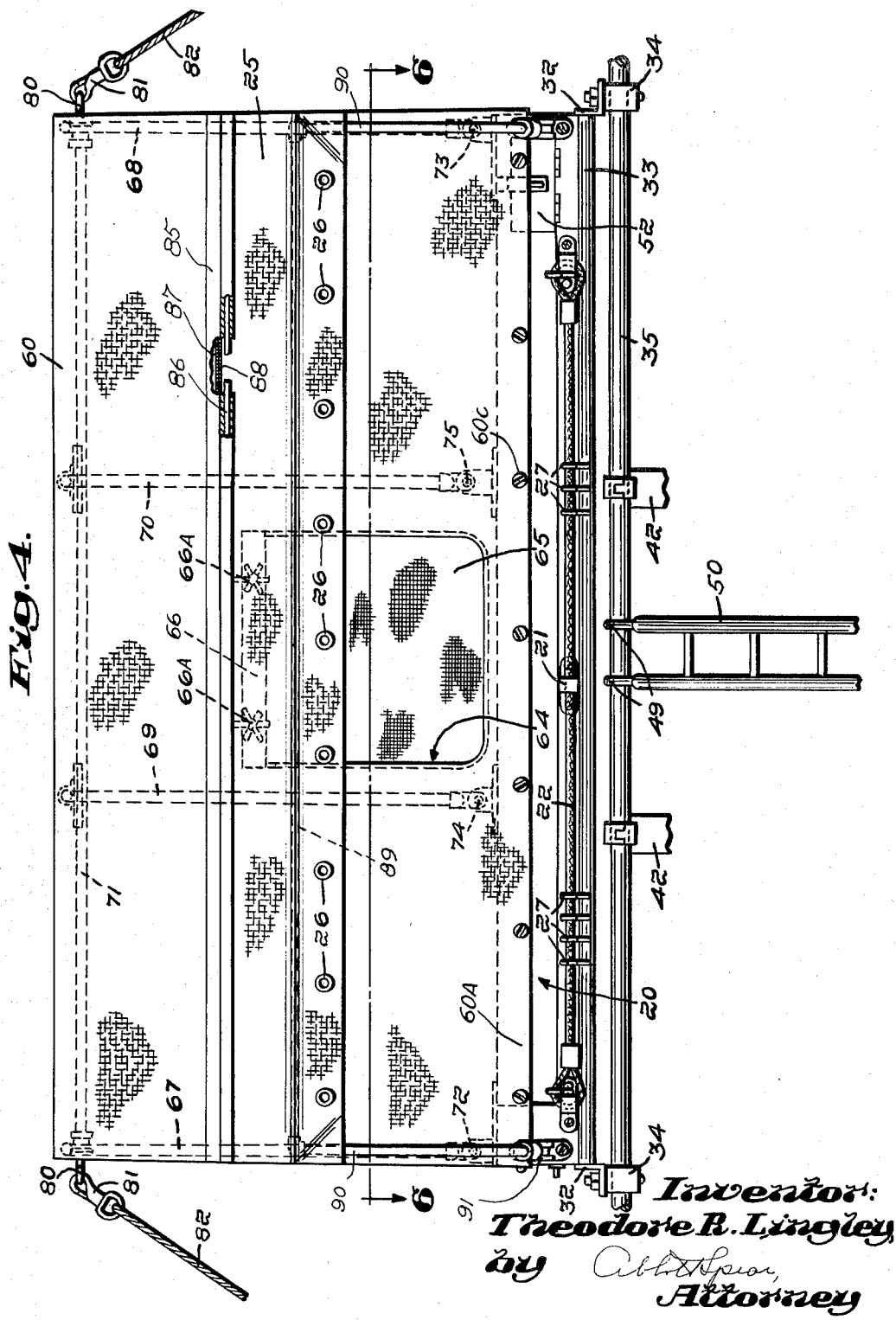

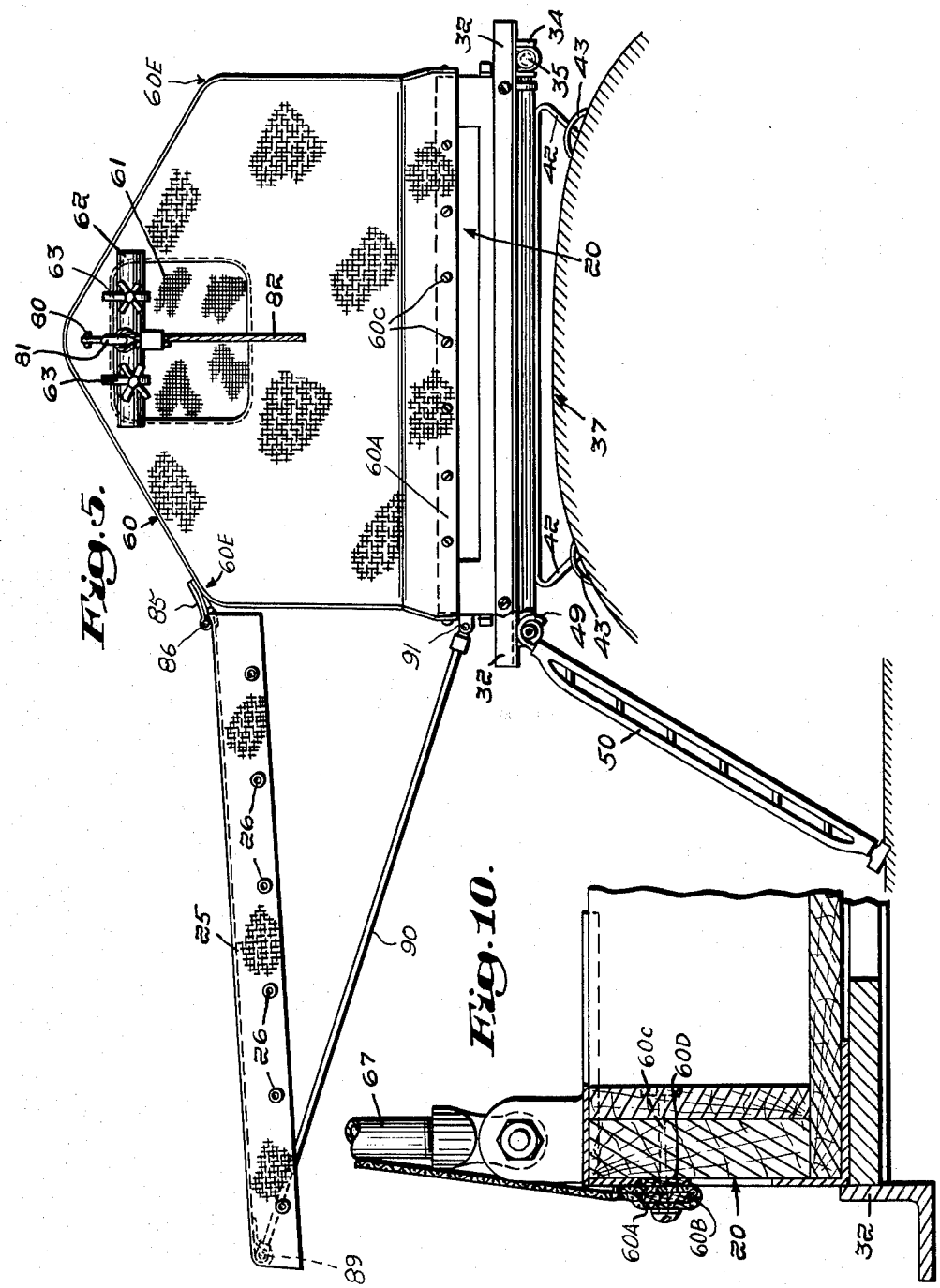

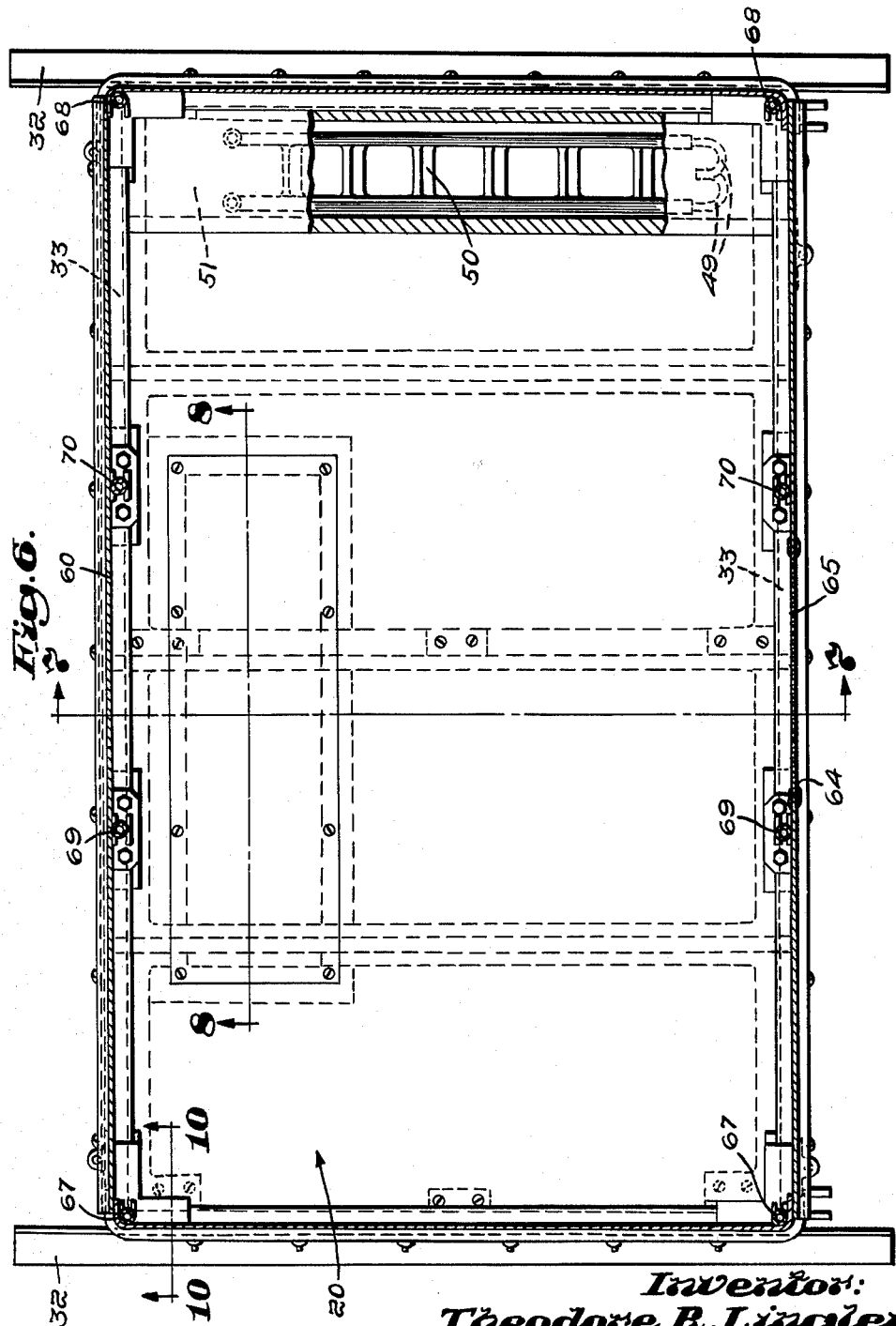

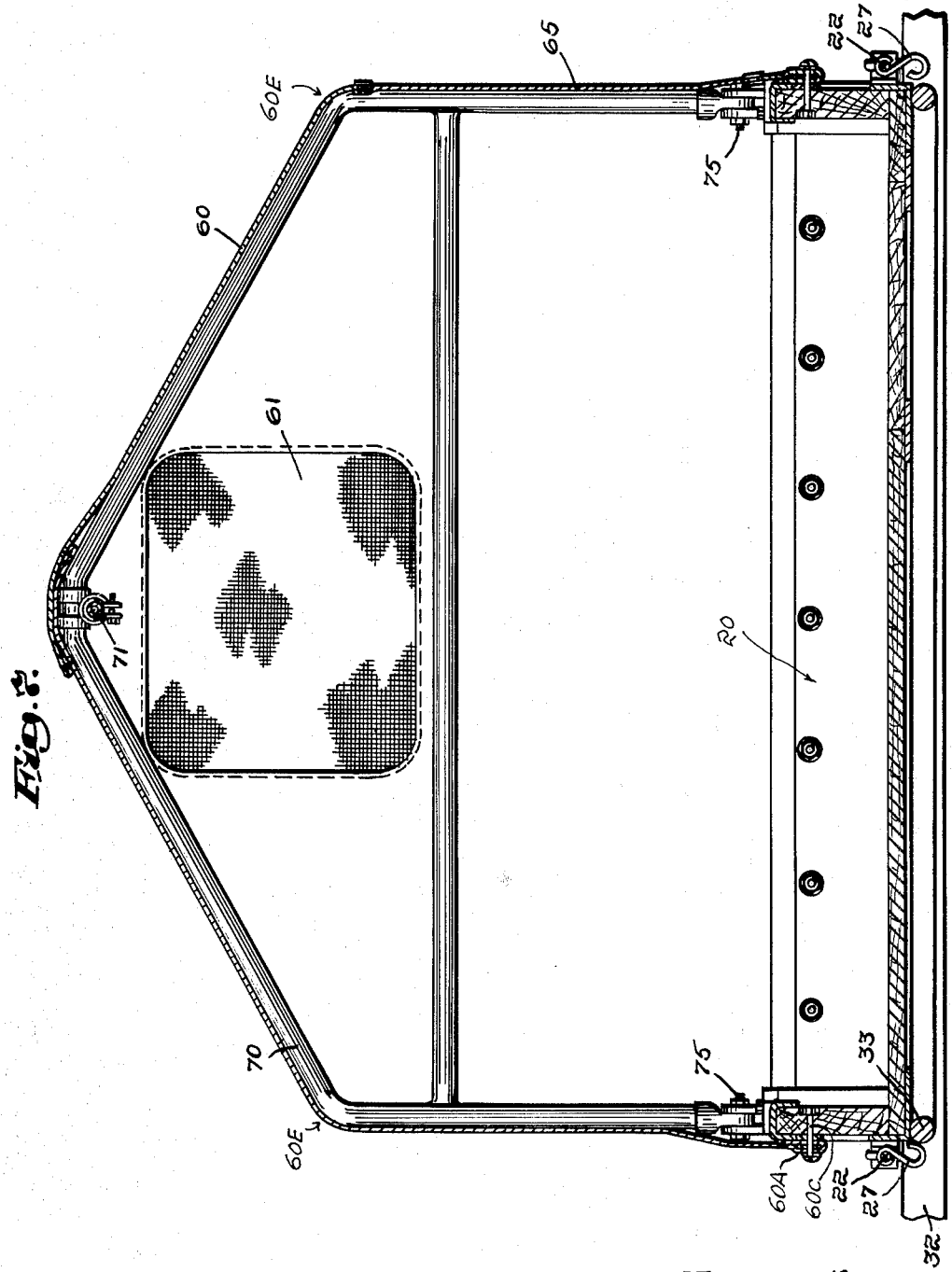

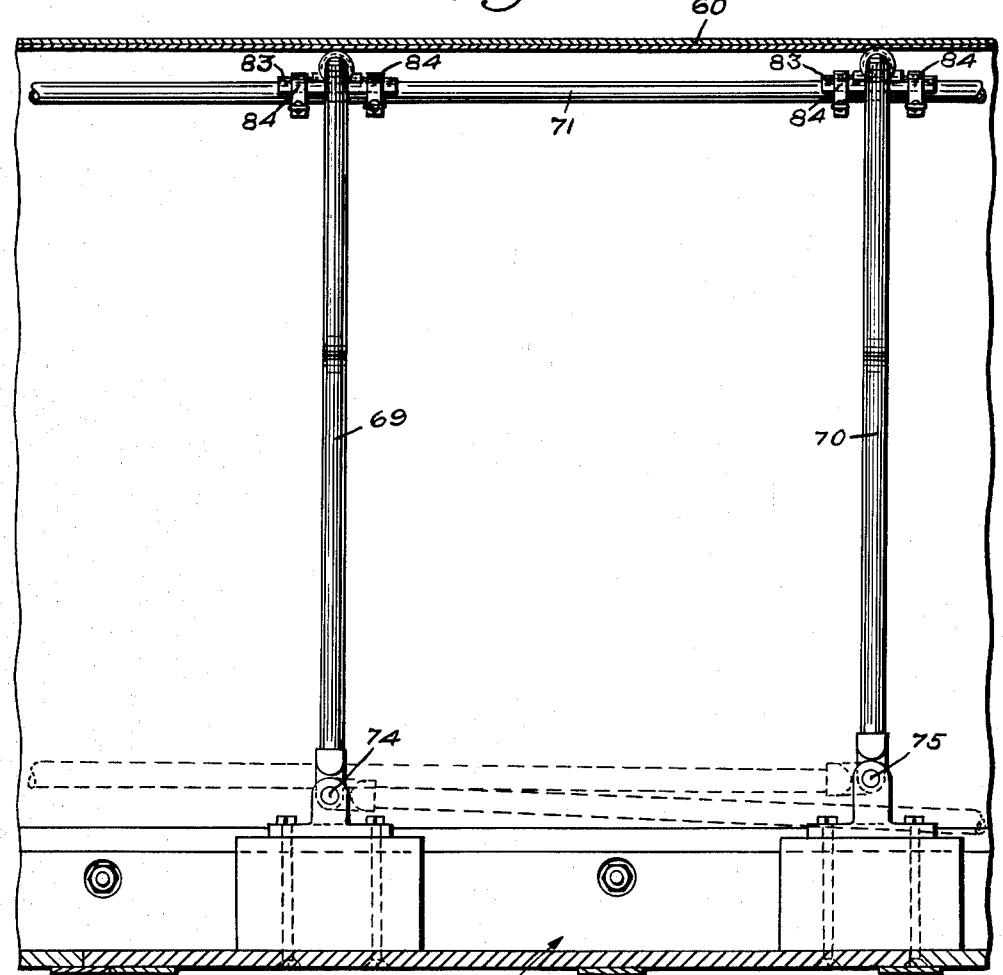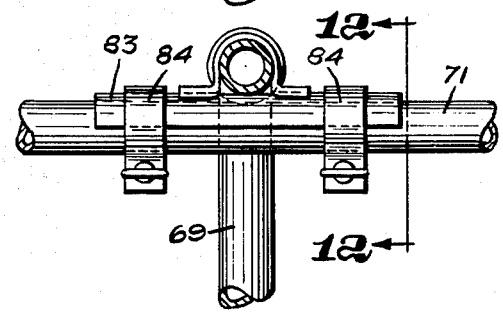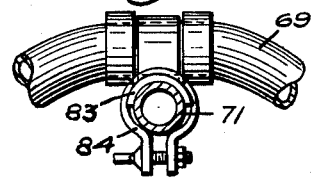

Oct. 5, 1965 T. R. LINGLEY 3,209,770
TENT-LIKE STRUCTURES
Filed Aug. 9, 1962 9 Sheets-Sheet 8
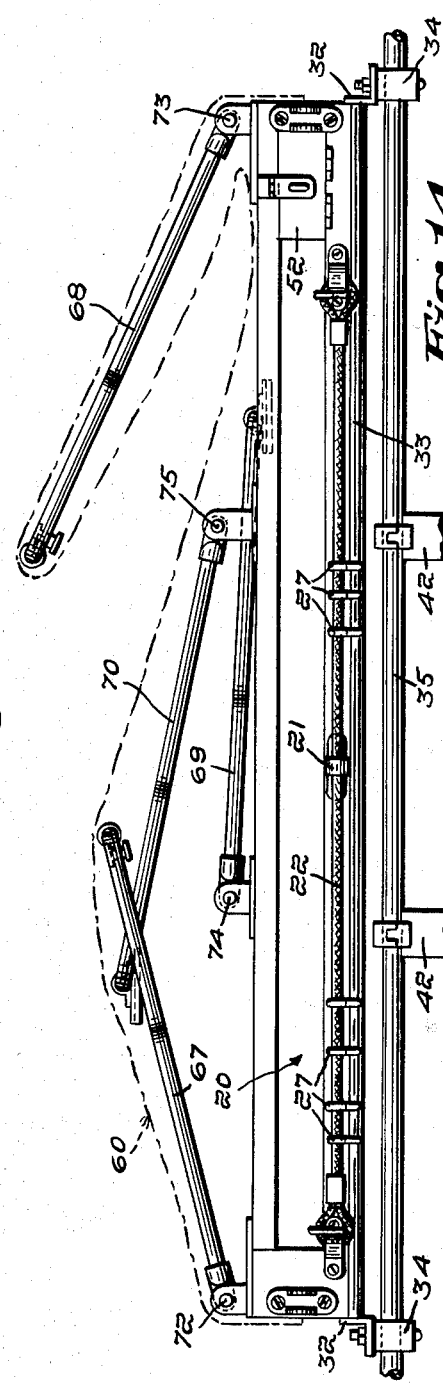
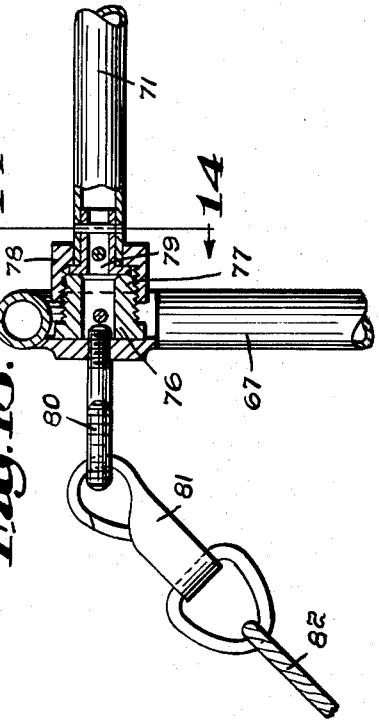
Inventor:
Theodore R. Lingley
by Abbott Spear
Attorney

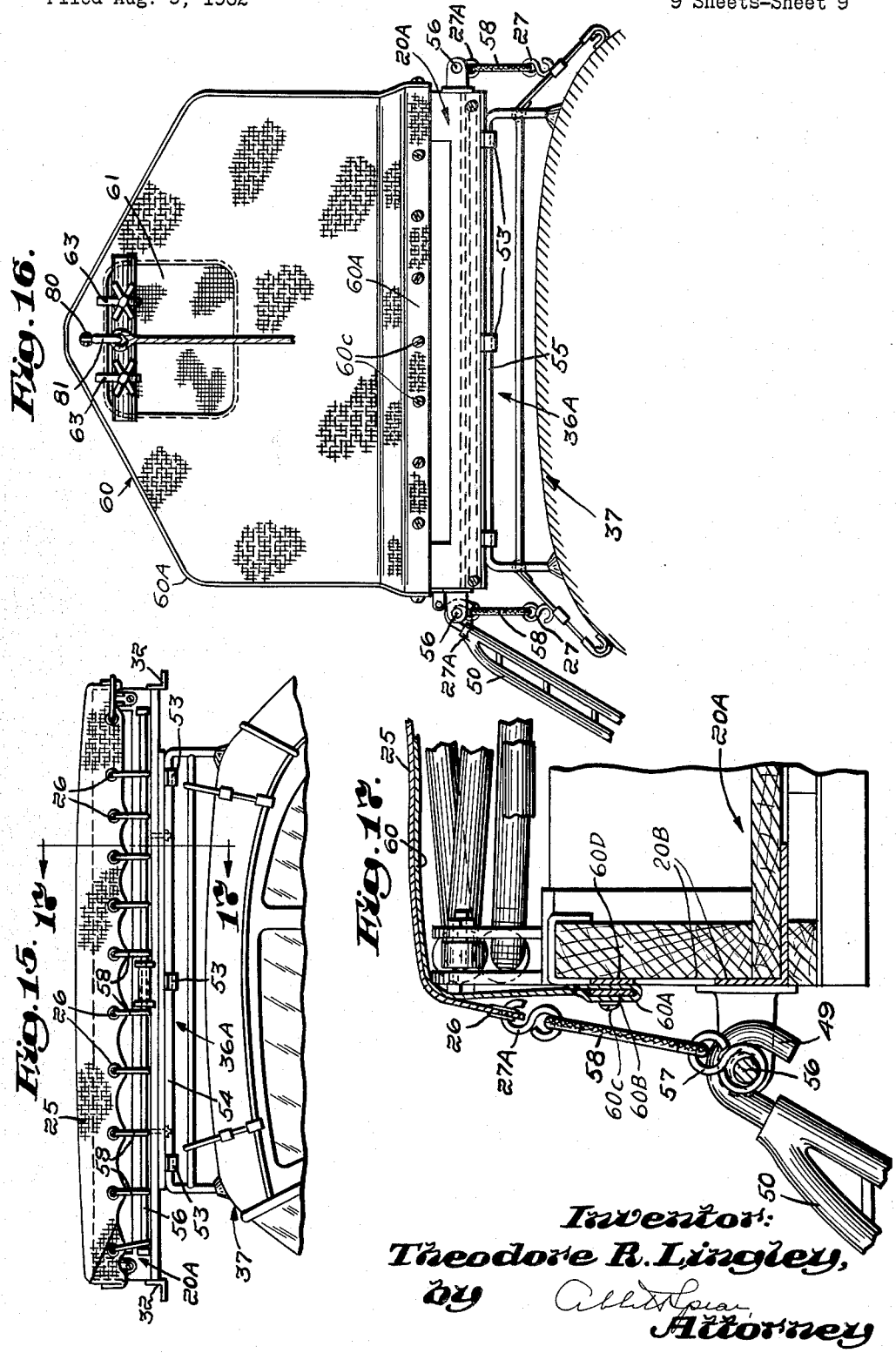

United States Patent Office 3,209,770
Patented Oct. 5, 1965

3,209,770
TENT-LIKE STRUCTURES
Theodore R. Lingley, 17 Warren Lane, Weston, Mass.
Filed Aug. 9, 1962, Ser. No. 215,958
3 Claims. (Cl. 135—1)

The present invention relates to tent-like structures and particularly to the bases and frames therefor.

The increase in travel by motor vehicle and the growth in interest in camping has resulted in a demand for portable living quarters, particularly sleeping quarters. While a variety of trailers are available providing such quarters, there are objections to all of the many types thereof. As a consequence, there is a need for light weight, portable, and collapsible tent-like structures that may be detachably supported by car-top carriers and erected thereon or detached therefrom and erected and used where desired, these structures to be insect and weather proof and safe from crawling animals and reptiles.

The general objective of the present invention is to provide tent-like structures of the latter type and this objective is attained by providing such a structure having a frame on a base, the frame including supports and a detachable ridge pole and supporting a flexible cover. Each support has a transverse portion and two side portions pivoted to the base transversely thereof so that, when the ridge pole is detached, the supports may be swung relatively to the base into positions of storage.

Another objective of the invention is to provide a frame of such a structure in which there are two end supports and at least one intermediate support and the ends of the ridge pole are locked to the end supports and each intermediate member has a ridge pole engaging seat with clamp means detachably interconnecting the ridge pole and such seats.

Yet another objective of the invention is to provide a base in the form of a relatively shallow box to the upper edges of the sides of which the supports are pivoted and with the margins of the cover secured to the sides of the base.

In the accompanying drawings, there are shown illustrative embodiments of the invention illustrating these and other of its objectives, novel features and advantages.

In the drawings:

FIGURE 1 is a side view of a car having a tent-like structure in accordance with the invention attached to a car-top carrier, the structure being stored in its base under a removable cover, FIGURES 2 and 3 are, respectively, front and rear end views thereof, FIGURE 4 is a view taken from the side of the car, showing the front of the erected structure, with the removable cover attached to provide a fly or awning, FIGURE 5 is a view of the erected structure as seen from the rear of the car, FIGURE 6 is a horizontal section, on an increased scale, of the erected structure showing the interior of the base, the base being partly sectioned, FIGURES 7 and 8 are sections taken approximately along the indicated lines 7—7 and 8—8, respectively, of FIGURE 6, FIGURE 9 is a side view of the base with the frame supports partly erected, FIGURE 10 is a section taken approximately along the indicated lines 10—10 of FIGURE 6, FIGURE 11 is a fragmentary and partly sectioned view of the connection between an intermediate support and the ridge pole, FIGURE 12 is a section taken approximately along the indicated lines 12—12 of FIGURE 11, FIGURE 13 is a fragmentary and partly sectioned view of a connection between the ridge pole and an end support, FIGURE 14 is a section taken approximately along the indicated lines 14—14 of FIGURE 13, FIGURE 15 is a view similar to FIGURE 1 illustrating modifications of the invention, FIGURE 16 is a view of the embodiment shown in FIGURE 15, as seen from the rear of the car, and FIGURE 17 is a fragmentary section taken approximately along the indicated lines 17—17 of FIGURE 15.

In the drawings, the base of a tent-like structure is generally indicated at 20 and shown as a relatively shallow, rectangular box whose sides have an intermediate eye 21 through which passes an elastic cable 22 having a hook 23 at each end anchored by an end eye 24. A cover 25 has a marginal series of grommets 26 caught by hooks 27 carried by the cables 22. The front edge of the cover 25, see FIGURE 2, is secured to the front of the base 20 as by snap fasteners 28 and is folded to provide side overlaps 29 each having a grommet 26 of its series caught by one of the side edge anchoring hooks 27. At the rear, the cover 25 is folded, as may be seen in FIGURE 3, so that the resulting overlaps 30 may be interconnected as by an elastic cord 31.

The base 20 is shown as having transverse members 32 attached to the front and rear ends and interconnected by underlying members 33. The members 32 protrude beyond the sides thereof and are shown as detachably anchored, as by clamps 34, to the horizontal members 35 of the generally indicated car top carrier 36. The members 35 are disposed lengthwise of the top of the generally indicated motor vehicle 37 and are joined to rear upright members 38 attached as at 39 to the rear bumper 40 and the members 35 and 38 are braced as at 41.

The car top carrier 36 is of the type described in my co-pending application, Serial No. 91,477, filed February 24, 1961, and now abandoned, and includes conventional cross members 42 that are held by supports 43 including hooks 44 caught on the gutters 45 of the vehicle 37. A cable 46 is shown as extending from the forward end of each member 35 to the front bumper 47 to which it is anchored as at 48. It is not necessary, of course, that the base be mounted on any particular car top carrier but the members 35 of the carrier 36 serve as a secure support for the hooks 49 that are connected to the ends of the ladder 50, to be turned relative thereto between positions of use and storage, see FIGURES 4, 5, and 6. In practice, the base 20 is provided, at its rear end, with a storage compartment 51 for the ladder 50, the compartment being closed by a door 52.

In FIGURES 15 and 16, a different type of carrier is generally indicated at 36A. The base 20A is shown as having clips 53 engageable with the rails 54 and 55 of the carrier 36A.

FIGURES 15, 16, and 17 also show a rod 56 mounted on each side of the base 20A with the hooks 57 being slidably confined thereon and attached to elastic sections 58 each of which is connected to one of the anchoring hooks 27A for entry into a grommet 26 of the cover 25.

The cover that establishes the walls and roof of the tent-like structure is generally indicated at 60 and is made of any suitable flexible waterproof material. The cover 60 has screened windows 61 secured in its end walls as by slide fasteners extending down one side, across the bottom, and up the other side, and, as shown in FIGURE 5, there may be a cover 62 above such a window and held in a rolled condition, when freed, by releasable ties 63. In addition there is an entry 64 shown as closed by a screen cloth 65 that is similarly attached to the structure as by a slide fastener and also by a cover 66, also attached preferably by a slide fastener. Either the screen cloth or the cover may be tied in a roll above the entry 64 as by ties 66A. Preferably, the slide fasteners are operable from within and those used for the screen cloth 65 or the cover 66 are also operable from the outside.

The cover 60 is shown in FIGURE 4 as supported by a frame including end supports 67 and 68, intermediate supports 69 and 70 and a ridge pole 71 and is marginally attached to the base 20 which has protective and reinforcing trim 20B. The cover 60 has marginal sheaths 60A which receive slats 60B and are attached by bolts 60C to the frame 20 through a second slat 60D whose thickness is approximately that of the trim, see FIGURE 10. The several supports are shown as of approximately U-shaped form and each such support has its free ends pivotally connected to the base 20, transversely thereof. The pivotal connections for the supports 67, 68, 69, and 70 are indicated at 72, 73, 74, and 75, respectively, see FIGURE 9, and these are shown as being so spaced and arranged along the edges of the sides of the base 20 that, in their folded position, see FIGURE 9, the intermediate supports 69 and 70 are folded towards each other and overlap and the two end supports 67 and 68, while folded towards each other, have their closed ends spaced apart. Flatness in folding is assured by having the pivotal connection 75 somewhat higher than the pivotal connection 74.

In order to permit such folding of the supports from their FIGURE 4 position, the ridge pole 71 must be detached and when detached, it is stored in the base 20. In order to provide for ease and convenience in detaching and attaching the ridge pole 71 and to insure a suitable frame, the end supports 67 and 68 are provided with mounts 76 whose proximate faces include hubs 77 which are threaded to receive caps 78, of which there is one rotatably mounted on each end of the ridge pole 71 as by the flanged keeper 79, see FIGURES 13 and 14. The outer face of each mount has an eye 80 enabling a hook 81 at one end of a guy 82 to be caught thereon. It will be noted that the mounts 76 are on the undersurfaces of the central part of the closed ends of the supports 67 and 68.

The intermediate supports 69 and 70, see FIGURES 11 and 12, have semicircular seats 83 on the undersurface of their central part, each dimensioned to receive the ridge pole 71 and of sufficient length to enable a pair of clamps 84, one on each side of an intermediate support, to lock the ridge pole 71 thereto.

With a tent-like structure in accordance with the invention as thus far described, it will be apparent that the ladder 50 is readily accessible and with it, it is easy for one to strip the cover 25 from the base 20 and then erect the several supports. It is optional whether the guys 82 are then anchored or the ridge pole 71 then secured in place thus to establish the cover 60 as the roof and walls of the structure with the junction therebetween being indicated at 60E.

It will be noted, see FIGURES 4, 5, and 7, that one cover 60 has a flap 85 adjacent the junction 60E and extending lengthwise of the structure. The flap 85 includes a reinforcement 86 and it overlies a section 87 of a slide fastener whose other section 88 is disposed along, but spaced inwardly of, an edge of the removable cover 25, thus to enable the removable cover 25 to be attached to the structure to enable it to function as a fly or awning.

Adjacent the opposite edge of the cover 25 there is provided a reinforcement 89 to whose ends there are attached braces 90 connected to the base 20 as at 91.

It will be apparent that such structures are easy to assemble while supported by car-top carriers and provides safe and comfortable sleeping quarters. Such structures are as easily disassembled and stored in their bases and can be quickly and easily detached from the car-top carriers and used wherever desired since, in storage, the structures are readily carried from place-to-place.

While outdoor activities are most widespread during the warmer weather, there is an ever increasing interest in activities during fall and winter months of which hunting, skiing, and ice fishing are typical examples.

Many outdoor activities, regardless of season, make it desirable to locate one's living quarters some distance from his motor vehicle. In that case, the tent-like structure is detached and moved to a desired location. In the wintertime, that location may be and often is on the ice and, for convenience, to occupant fisherman, there is a removable floor section 20C to enable one to fish through a hole or holes below it without having to brave the outdoors when the weather is harsh.

In practice, the structure is removed by detaching the clamps 34 from the members 35 and, if desired, the clamps 34 may be used to attach runners (not shown) to enable the collapsed structure to be pulled over the snow or ice with maximum ease and convenience.

I claim:

1. In a tent-like structure, a base, a pair of supports, each support including a transverse arch portion, two side portions, and a depending, rigid mount centrally of each arch portion and including a threaded hub, the hubs of the mounts being disposed towards each other and in alinement, means pivotally connecting the side portions to said base transversely thereof so that they may be swung between frame establishing positions and positions of storage relative to said base, a ridge pole, a rotatable clamping member on each end of said ridge pole, each clamping member being adapted to be threaded on an appropriate one of said hubs, the outer faces of said mounts each including a guy line anchor, and a cover of flexible material supported by said frame and marginally attached to said base, said anchors being exposed exteriorly of said cover.

2. In a tent-like structure, a base, a series of supports including a pair of end supports and at least one intermediate support, each support including a transverse arch portion and two side portions, means pivotally connecting the side portions to said base transversely thereof so that they may be swung between frame establishing positions and positions of storage relative to said base, each arch portion including a central, depending rigid mount, a ridge pole extending under said intermediate support and detachably attached to the inner faces of said mounts of said end supports to lock said end supports against movement relative to each other, the outer faces of said mounts of said end supports including a guy line anchor, said intermediate support mount including an arcuate seat, slidable means detachably clamping said ridge pole to said seat, and a cover of flexible material supported by said frame and marginally attached to said base.

3. In a tent-like structure, a base in the form of a relatively shallow upwardly opening box, a pair of supports, each support including a transverse portion and two side portions, means pivotally connecting the side portions to said base transversely thereof so that they may be swung between frame establishing positions and positions of storage relative to said base, a ridge pole detachably attached to said supports, and a first cover of flexible material supported by said frame and marginally attached to said base, and a second cover dimensioned to overlie said base, said second cover and base including portions interengageable to secure said second cover to the base when the supports are in their position of storage and the first cover is disposed thereon for storage, said first named cover having an opening, said first and second covers having complemental, interengageable fastening means, the fastening means of the first cover being above said opening, the fastening means of the second cover being adjacent one edge thereof, and brace means attached to said base and attachable to the second cover adjacent the opposite edge and disposed to hold said second cover as an awning when the first cover is held by the supports when in their operative position and the second cover is detached from said base and attached by said fastening means to said first cover.

References Cited by the Examiner

UNITED STATES PATENTS

| 1,617,435 | 2/27 | Coleman et al. | 135—3 |
| 2,464,884 | 3/49 | Noyes | 135—4 |
| 2,713,689 | 7/55 | Godwin | 135—4 |
| 2,840,400 | 6/58 | Godwin | 135—3 |
| 2,857,924 | 10/58 | Gibbons et al. | 135—1 |
| 2,896,650 | 7/59 | Eigner | 135—4 |
| 2,917,059 | 12/59 | Emanuelson | 135—1 |
| 2,942,609 | 6/60 | Ferguson | 135—1 |
| 3,028,609 | 4/62 | Tolf | 135—1 |

FOREIGN PATENTS 623,900 5/49 Great Britain.

HARRISON R. MOSELEY, Primary Examiner.

BENJAMIN BENDETT, Examiner.